US010404996B1

(12) United States Patent
Huang

(10) Patent No.: US 10,404,996 B1
(45) Date of Patent: Sep. 3, 2019

(54) SYSTEMS AND METHODS FOR USING MULTIPLE FRAMES TO ADJUST LOCAL AND GLOBAL MOTION IN AN IMAGE

(71) Applicant: Marvell International Ltd., Hamilton (BM)

(72) Inventor: Samson Huang, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 367 days.

(21) Appl. No.: 15/239,027

(22) Filed: Aug. 17, 2016

Related U.S. Application Data

(60) Provisional application No. 62/240,886, filed on Oct. 13, 2015.

(51) Int. Cl.
*H04N 19/527* (2014.01)
*H04N 19/172* (2014.01)
*H04N 19/139* (2014.01)
*H04N 19/43* (2014.01)
*H04N 19/182* (2014.01)
*H04N 19/36* (2014.01)

(52) U.S. Cl.
CPC ......... *H04N 19/527* (2014.11); *H04N 19/139* (2014.11); *H04N 19/172* (2014.11); *H04N 19/182* (2014.11); *H04N 19/43* (2014.11); *H04N 19/36* (2014.11)

(58) Field of Classification Search
CPC .... H04N 19/527; H04N 19/80; H04N 19/895; H04N 19/82; H04N 19/85; H04N 19/86; H04N 19/89
See application file for complete search history.

(56) References Cited

U.S. PATENT DOCUMENTS

| | | | | |
|---|---|---|---|---|
| 5,488,570 A * | 1/1996 | Agarwal | ................ | H04N 7/15 345/501 |
| 5,565,920 A * | 10/1996 | Lee | ...................... | H04N 19/503 348/699 |
| 6,778,605 B1 * | 8/2004 | Hamanaka | ........... | H04N 19/527 348/416.1 |
| 8,971,410 B2 * | 3/2015 | Lee | ...................... | H04N 19/51 375/240.16 |
| 2003/0043912 A1 * | 3/2003 | Sun | ...................... | H04N 19/52 375/240.16 |

(Continued)

FOREIGN PATENT DOCUMENTS

GB 2315182 A * 1/1998 ............. H04N 5/145

*Primary Examiner* — David N Werner

(57) ABSTRACT

Systems and methods are provided for mitigating image noise. Portion motion vectors are identified for a plurality of portions of a first frame relating to a setting, the portion motion vectors indicating motion from the first frame to a second frame. A global motion vector is determined that indicates global motion spanning the first frame to the second frame. A determination is made that a first portion of the plurality of portions has a portion motion vector that is consistent with the global motion vector. Motion compensation is performed on the first frame and the second frame to align the second frame with first frame at the first portion that is consistent with the global motion vector to generate an output image that is based on both of the two frames. An inconsistent second portion of one of the frames is incorporated into the output image.

23 Claims, 13 Drawing Sheets

(56) References Cited

U.S. PATENT DOCUMENTS

| | | | | |
|---|---|---|---|---|
| 2003/0123549 | A1* | 7/2003 | Yang | H04N 19/527 |
| | | | | 375/240.16 |
| 2005/0049852 | A1* | 3/2005 | Chao | G06F 17/277 |
| | | | | 704/9 |
| 2005/0105621 | A1* | 5/2005 | Ju | H04N 19/527 |
| | | | | 375/240.17 |
| 2006/0215036 | A1* | 9/2006 | Chung | H04N 5/23248 |
| | | | | 348/208.4 |
| 2006/0215037 | A1* | 9/2006 | Tsunekawa | H04N 5/145 |
| | | | | 348/211.99 |
| 2007/0076796 | A1* | 4/2007 | Shi | H04N 19/51 |
| | | | | 375/240.16 |
| 2008/0084934 | A1* | 4/2008 | Agrawal | H04N 7/64 |
| | | | | 375/240.27 |
| 2008/0112630 | A1* | 5/2008 | Nestares | H04N 5/144 |
| | | | | 382/236 |
| 2011/0310970 | A1* | 12/2011 | Lee | H04N 19/51 |
| | | | | 375/240.16 |
| 2013/0322766 | A1* | 12/2013 | Alpert | G06K 9/481 |
| | | | | 382/197 |
| 2017/0013279 | A1* | 1/2017 | Puri | H04N 19/176 |

\* cited by examiner

US 10,404,996 B1

SYSTEMS AND METHODS FOR USING MULTIPLE FRAMES TO ADJUST LOCAL AND GLOBAL MOTION IN AN IMAGE

CROSS-REFERENCE TO RELATED APPLICATIONS

The present application claims priority from U.S. Provisional Application Ser. No. 62/240,886 entitled "Multi-frame Denoise with Local Motion Adaptation," filed 13 Oct. 2015, the entirety of which is hereby incorporated by reference.

FIELD

This disclosure is related generally to image processing and more particularly to improvement of image quality using multiple image frames captured of a setting.

BACKGROUND

Noise is often a significant problem in the field of digital imagery. For example, in low light conditions, noise can be captured at such a high level that it materially affects the quality of an image captured of a setting (i.e., physical objects in a physical setting that are captured in a photograph image). An easy solution in such a scenario is to increase the light level of the setting being imaged. But this is not always possible due to the availability of additional light sources or a desire to capture the setting in its native state. Simple signal amplification is also often not helpful because such amplification amplifies noise as well as desired signals. Systems and methods as described herein are configured to increase image quality by reducing noise levels in an image of a setting.

SUMMARY

Systems and methods are provided for mitigating image noise. Portion motion vectors are identified for a plurality of portions of a first frame relating to a setting, the portion motion vectors indicating motion from the first frame to a second frame. A global motion vector is determined that indicates global motion spanning the first frame to the second frame. A determination is made that a first portion of the plurality of portions has a portion motion vector that is consistent with the global motion vector, where a second portion has a portion motion vector that is inconsistent with the global motion vector. Motion compensation is performed on the first frame and the second frame to align the second frame with first frame at the first portion that is consistent with the global motion vector to generate an output image that is based on both of the two frames. The inconsistent second portion of one of the frames is incorporated into the output image.

As another example, a processor-implemented system for mitigating image noise includes a processor system that includes one or more data processors. One or more computer-readable mediums are encoded with instructions for commanding the processing system to execute steps. In the steps, portion motion vectors are identified for a plurality of portions of a first frame relating to a setting, the portion motion vectors indicating motion from the first frame to a second frame. A global motion vector is determined that indicates global motion spanning the first frame to the second frame. A determination is made that a first portion of the plurality of portions has a portion motion vector that is consistent with the global motion vector, where a second portion has a portion motion vector that is inconsistent with the global motion vector. Motion compensation is performed on the first frame and the second frame to align the second frame with first frame at the first portion that is consistent with the global motion vector to generate an output image that is based on both of the two frames. The inconsistent second portion of one of the frames is incorporated into the output image.

As a further example, a computer-readable medium is encoded with instructions for commanding a processing system to execute steps of a method for mitigating image noise. In the method, portion motion vectors are identified for a plurality of portions of a first frame relating to a setting, the portion motion vectors indicating motion from the first frame to a second frame. A global motion vector is determined that indicates global motion spanning the first frame to the second frame. A determination is made that a first portion of the plurality of portions has a portion motion vector that is consistent with the global motion vector, where a second portion has a portion motion vector that is inconsistent with the global motion vector. Motion compensation is performed on the first frame and the second frame to align the second frame with first frame at the first portion that is consistent with the global motion vector to generate an output image that is based on both of the two frames. The inconsistent second portion of one of the frames is incorporated into the output image.

DETAILED DESCRIPTION

Figure 1:
FIG. 1 is a diagram depicting an image affected by noise.

FIG. 1 is a diagram depicting an image that depicts a setting. The image was taken in a low light condition by an image sensor using a single frame (i.e., an image capture at a moment in time), such as an image sensor of a standalone camera or a camera integrated into a mobile user computing device. Low lighting conditions limit how much meaningful image data the image sensor can capture in a single frame. Because the image sensor is unable to capture sufficient image data, the captured image is corrupted to an extent by noise, resulting in a less than optimal output image like the one depicted in FIG. 1.

A large portion of noise, such as the noise depicted in FIG. 1, changes randomly over time. That is, multiple frames depicting a setting taken over a short period of time would have noise components that differ randomly across the multiple frames. Such noise is amenable to being filtered in the time domain. By averaging pixel values (e.g., red, green, and blue (RGB) component values for a pixel) of corresponding pixels (i.e., the pixel at x-y position (1, 1) in a first frame, the pixel at x-y position (1, 1) in a second frame, the pixel at x-y position (1,1) in a third frame, . . . ) in frames captured of the setting over time (i.e., across the multiple frames depicting the setting), noise levels can be reduced. For example, a setting can be captured via a burst mode capture (e.g., capturing 10 frames in 1 second, 5 frames in 0.5 seconds). The corresponding pixel values across the multiple, burst mode-captured frames pixels can be averaged to create a composite output image, and the resulting composite output image will often exhibit less noise and a higher quality level than any of the individual frames.

Figure 2:
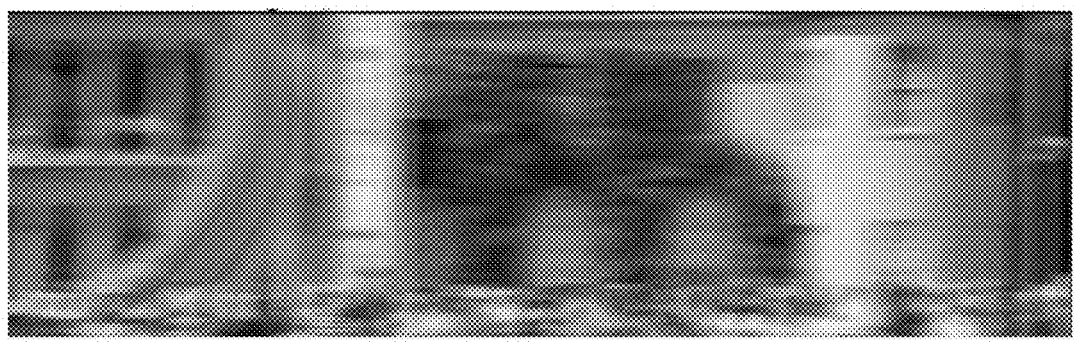
FIG. 2 is a diagram depicting a blurring effect resulting from averaging pixel values of corresponding pixels of multiple frames of a setting that exhibits global motion.

However, averaging pixel values of corresponding pixels across multiple frames relating to a setting that includes motion can actually decrease the quality of the composite image. Multiple sources may give rise to motion in frames related to a setting. A first example is motion that originates from the image capture device (e.g., a camera) itself. For example, if the camera is panning or zooming during a burst frame capture, each frame (except the initial frame) will be offset from the prior frame by a certain distance or magnitude of enlargement based on movement of the setting in a frame of reference relative to the camera. This type of motion that exists across an entire image is referred to as global motion. When averaging pixel values of corresponding pixels for sequentially captured frames that include global motion, a blurring effect can be present in the resulting composite image. FIG. 2 depicts an example of a blurring effect resulting from averaging pixel values of corresponding pixels of multiple frames of a setting that exhibits global motion.

The effects of global motion, like those depicted in the example of FIG. 2 can be mitigated using a motion compensation technique. The motion compensation technique includes identifying an amount of motion between burst-captured frames. Each frame of the burst capture, after the first frame, is adjusted so that it is aligned with a first frame of the burst capture. The pixel values of corresponding pixels of the now-alighted subsequent frames and the first frame can then be averaged to provide a composite output image that is often of improved quality.

Figure 3:
FIG. 3 depicts an example of local motion blurring, where a person was moving their head across multiple frames captured of a setting.

Another example of motion is local motion. For example, an object depicted in a setting may be moving based on a frame of reference other than the frame of reference of the camera (e.g., based on an earth frame of reference). Averaging pixel values of corresponding pixels across frames of a setting that exhibit local motion will also result in a blurring effect, albeit a different blurring effect than that resulting from global motion. FIG. 3 depicts an example of local motion blurring, where a person was moving their head across multiple frames captured of a setting. In this example, the blurring effect in FIG. 3 is only present at the portions of the setting associated with motion of the person's head.

Figure 4:
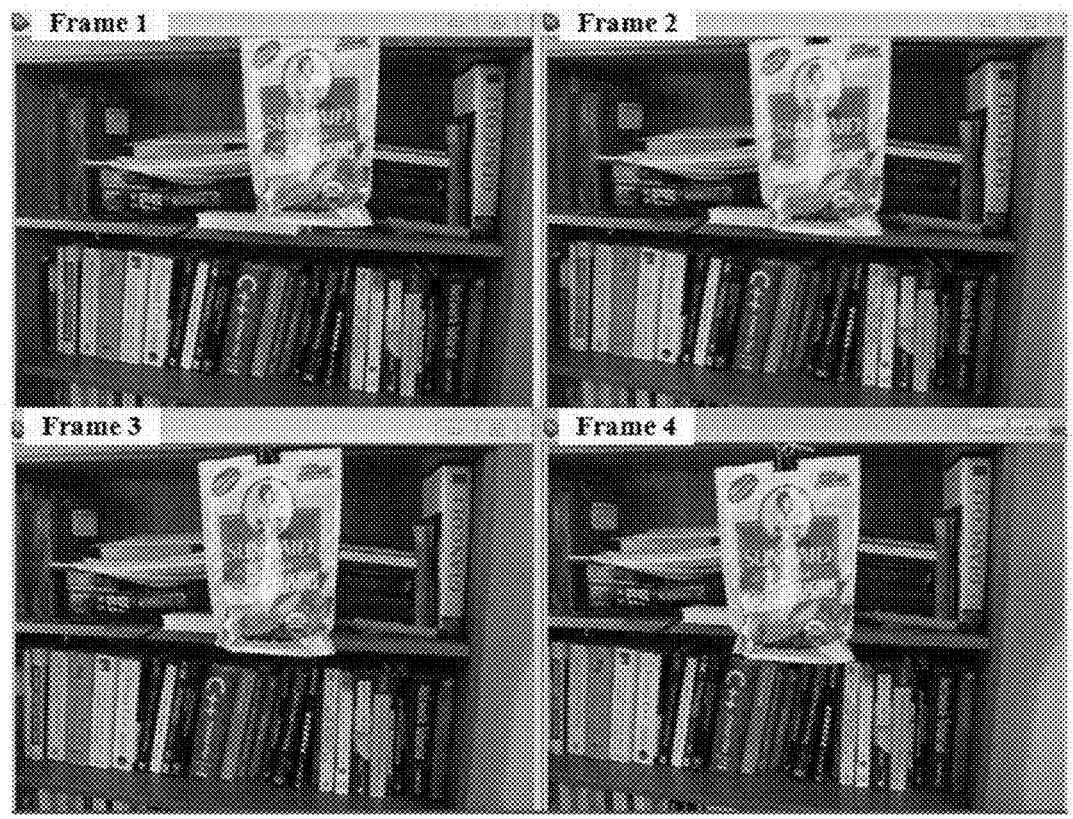
FIG. 4 is an illustration of frames of a setting captured via a burst frame capture mode.
Figure 5:
FIG. 5 is a diagram depicting a result of performing global motion compensation and corresponding pixel averaging, as discussed above with reference to FIG. 2.

Performing the global motion compensation technique discussed above with reference to FIG. 2 is often not sufficient when image frames exhibit local motion or both local and global motion. FIG. 4 is an illustration of frames of a setting captured via a burst frame capture mode. The burst frame capture mode results in the capture of the four frames relating to the same setting. These four frames exhibit two types of motion. First, the image frames were captured during a panning action, where the camera panned from left to right during the capture of the four frames. Additionally, the bag of raisins depicted in FIG. 4 was falling from top to bottom during the burst frame capture. The panning activity resulted in global motion, while the falling bag resulted in additional local motion within the setting. FIG. 5 is a diagram depicting a result of performing global motion compensation and corresponding-pixel pixel value averaging, as discussed above with reference to FIG. 2. While the bookshelf in the background appears brighter and less noisy than in the four frames of FIG. 4, averaging pixel values of corresponding pixels associated with the bag dropping's local motion results in significant blurring in that portion of the output image.

Figure 6:
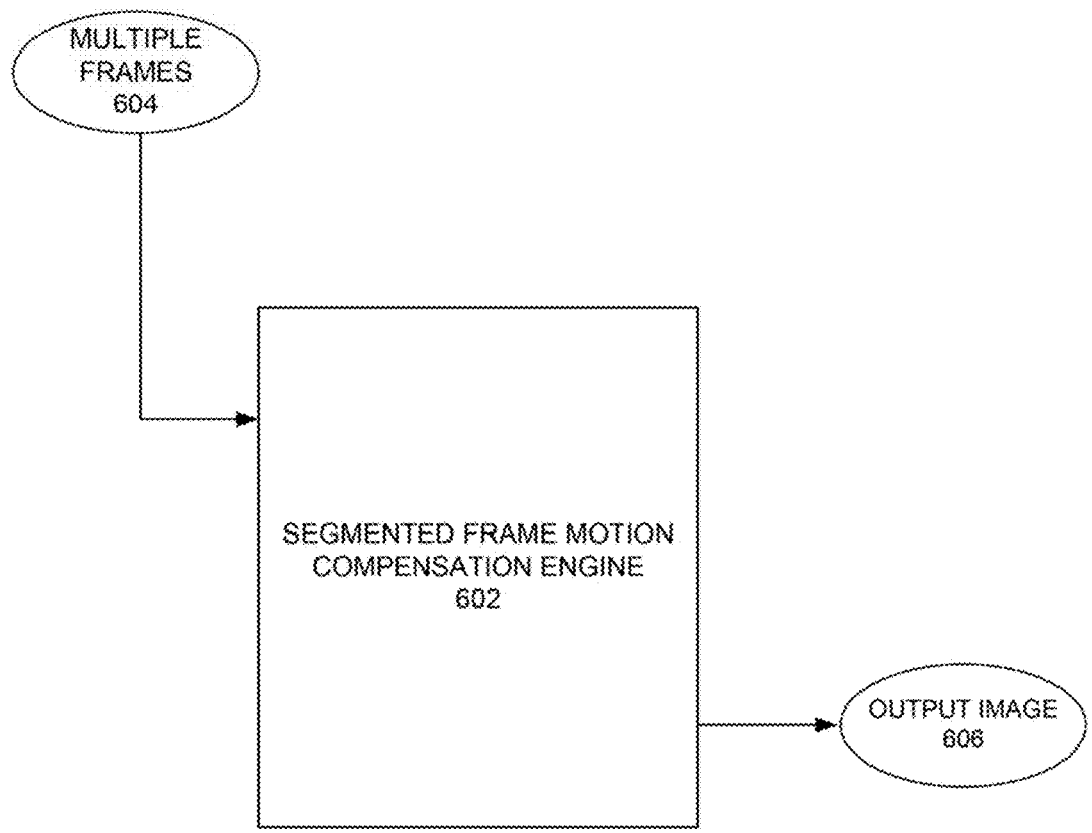
FIG. 6 is a diagram depicting a system for providing segmented frame motion compensation.

FIG. 6 is a diagram depicting a system for providing segmented frame motion compensation. A segmented frame motion compensation engine 602 receives image data, such as a series of frames 604 of a setting captured in a burst mode. Each of the frames relate to the same setting and may differ from one another due to motion of the image capture device and/or motion occurring in the setting during the burst capture of the frames 604. The compensation engine 602 determines an output image 606 based on motion detected between the frames related to the setting. The compensation engine 602 identifies portions of the frames (e.g., where a portion is defined as an area of a first captured frame of a series of burst captured frames) that exhibit global motion and performs motion compensation and averaging operations on those portions, using data from multiple frames for these consistent portions in the output image. The compensation engine 602 performs different compensation or no compensation at all on other portions that do not exhibit global motion (e.g., portions that exhibit local motion or no motion at all), using data from one of the multiple frames for these inconsistent portions in the output image.

Figure 7:
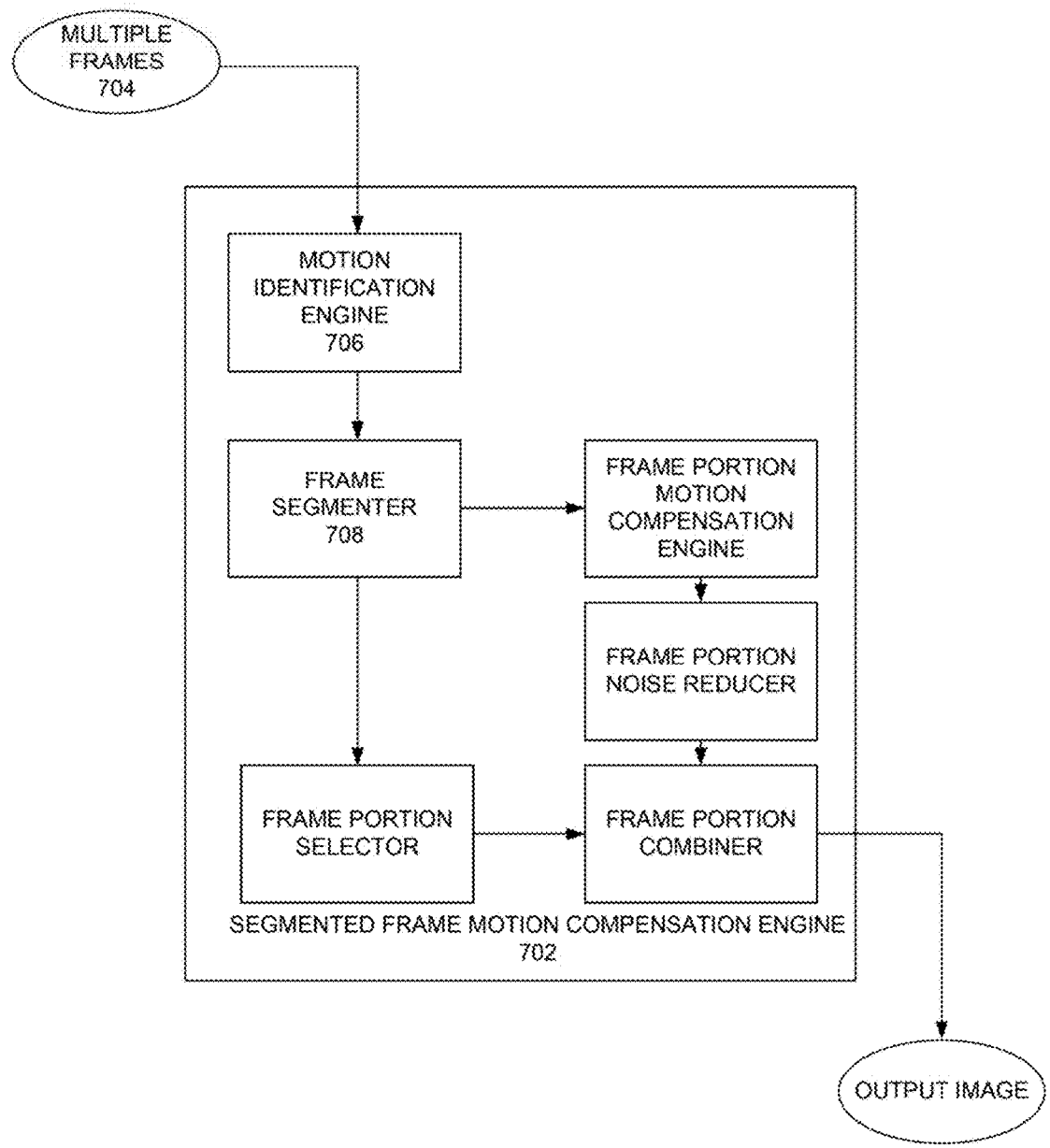
FIG. 7 is a diagram depicting example components of an example segmented frame motion compensation engine.

FIG. 7 is a diagram depicting example components of a segmented frame motion compensation engine in one example. A compensation engine 702 accesses image data in the form of multiple frames 704 depicting a setting (e.g., frames captured in a burst mode), where the multiple frames differ from one another based on motion occurring within the setting during frame capture. A motion identification engine 706 identifies motion vectors indicating motion (e.g., indicating magnitude and direction of motion) between the image frames. The motion identification engine 706 may utilize one of a variety of motion identification techniques. In one example, the motion identification engine 706 identifies anchor points (e.g., a corner of a desk, an eyeball of a person) that exist in a first frame of the multiple frames 704. The motion identification engine 706 then determines a change in the position of the identified anchor points between frames. For example, the motion identification engine 706 determines position changes for each anchor point between consecutive frames (e.g., between a first frame and a second frame captured a short time (e.g., 0.1 sec) after the first frame was captured). The motion identification 706 may store the resulting information as point motion vectors corresponding to the anchor points. Because there may be different types of motion associated with a setting, different anchor points in an image can have point motion vectors having differing magnitudes and directions.

Figure 8:
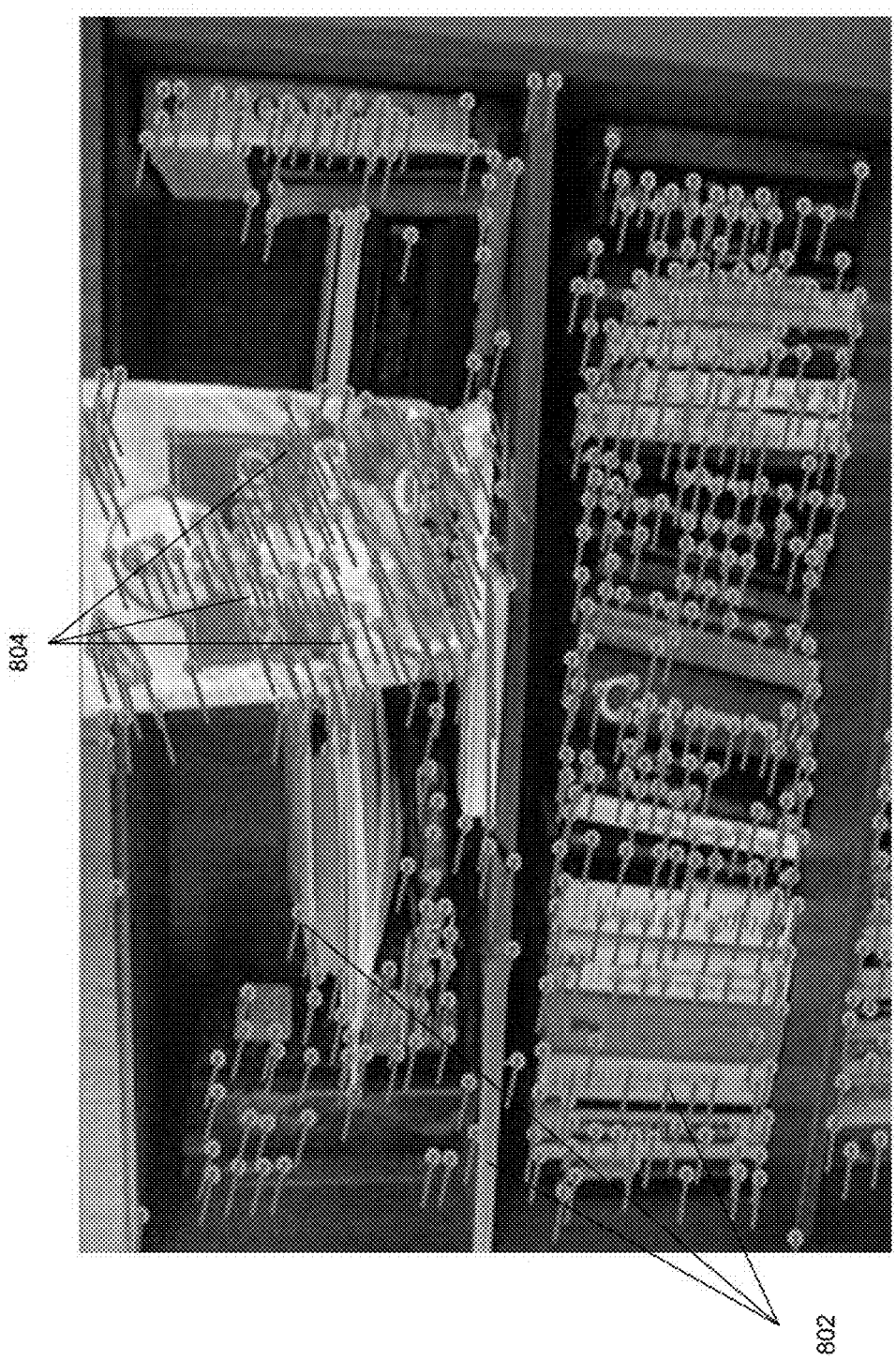
FIG. 8 illustrates an example of point motion vectors for several anchor points.

FIG. 8 illustrates an example of point motion vectors (e.g., individual feature point (or key point) motion vectors) for several anchor points. As shown in FIG. 8, each circle indicates an anchor point of a first frame. Anchor points can be identified using an image feature detection procedure. A line emanates from each anchor point circle, ending at positions of corresponding anchor points in a second frame of a burst mode capture. Many of the anchor points (e.g., anchor points associated with the books in the background) have point motion vectors of common direction and magnitudes. These motion vectors (e.g., vectors labeled 802) are largely associated with the global panning motion present in the captured frames. The point motion vectors (e.g., vectors labeled 804) associated with the dropping bag are of a different magnitude and direction than the point motion vectors 802 of the background anchor points. These point motion vectors are based on a combination of the global panning motion and the local motion of the bag falling.

The motion identification engine 706 of FIG. 7 identifies point motion vectors for each of the anchor points depicted visually in FIG. 8 (e.g., by finding the anchor points in a first frame and a second frame and determining an x-y position difference of those points between those two frames). The motion identification engine 706 stores those point motion vectors in a data structure. The motion identification engine 706 further identifies a global motion vector associated with the entire setting. The global motion vector can be determined in a variety of ways. For example, a most commonly appearing point motion vector (e.g., by grouping similar magnitude and direction point motion vectors and counting members of each group) among the point motion vectors can be selected as a global motion vector. The global motion vector can also be determined based on an average of all point motion vectors (e.g., all point motion vectors depicted in FIG. 8).

Figure 9:
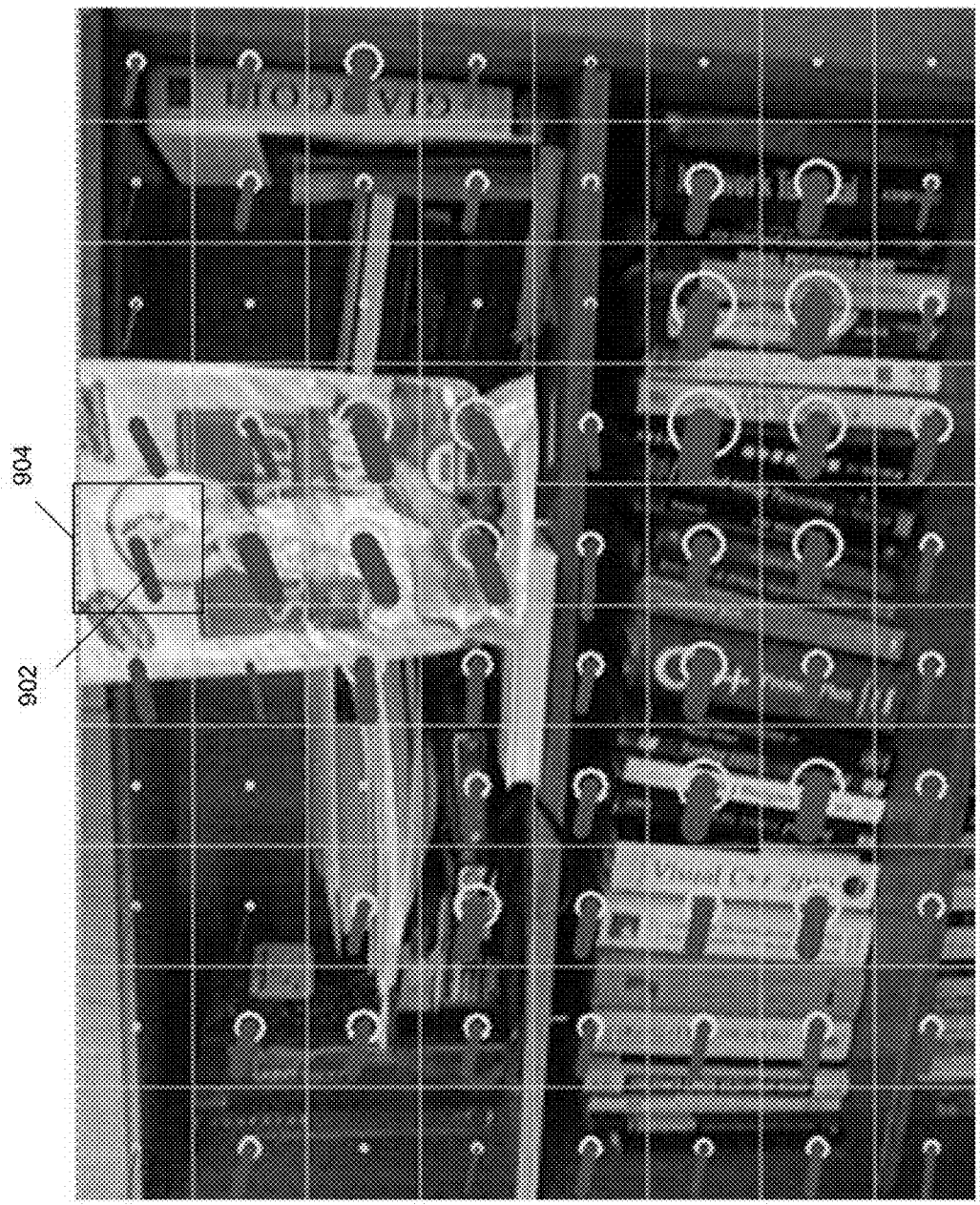
FIG. 9 is a diagram depicting an illustration of an image frame divided into 80 portions, with a portion motion vector indicated for each of the 80 portions.

The motion identification engine 706 further calculates portion motion vectors. FIG. 9 is a diagram depicting an illustration of an image frame divided into 80 portions (i.e., divided according to the orthogonal grid lines), with a portion motion vector indicated for each of the 80 portions (e.g., a 2-dimensional motion vector histogram). The portion motion vectors are indicated by a line that shows motion vector direction, with a width of the line and a size of the originating circle for the line both indicating the magnitude of the portion motion vector for that portion (i.e., a larger circle and a larger line indicating a portion motion vector having a larger magnitude). The portion motion vector 902 for a particular portion 904 is determined based on point motion vectors calculated for anchor points present within the particular portion 904 in the first frame of the multiple, burst captured frames. A portion motion vector (e.g., 902) can be calculated for a portion (e.g., 904) using similar techniques as a global motion vector for the entire setting. For example, a most commonly appearing point motion vector (e.g., by grouping similar magnitude and direction point motion vectors and counting members of each group) among the point motion vectors in the portion (e.g., 904) can be selected as a portion motion vector (e.g., 902). The portion motion vector (e.g., 902) can also be determined based on an average of all point motion vectors associated with the portion (e.g., all point motion vectors in portion 904).

An frame segmenter 708 uses the point motion vectors to classify portions of the setting (e.g., portions of the first frame) by determining which portions of the setting are consistent (i.e., having portion motion vectors that are less than a threshold amount different from the global motion vector) with the global motion vector for the setting. Portions not deemed consistent with the global motion vector are inconsistent with the global motion vector of the setting.

Figure 10:
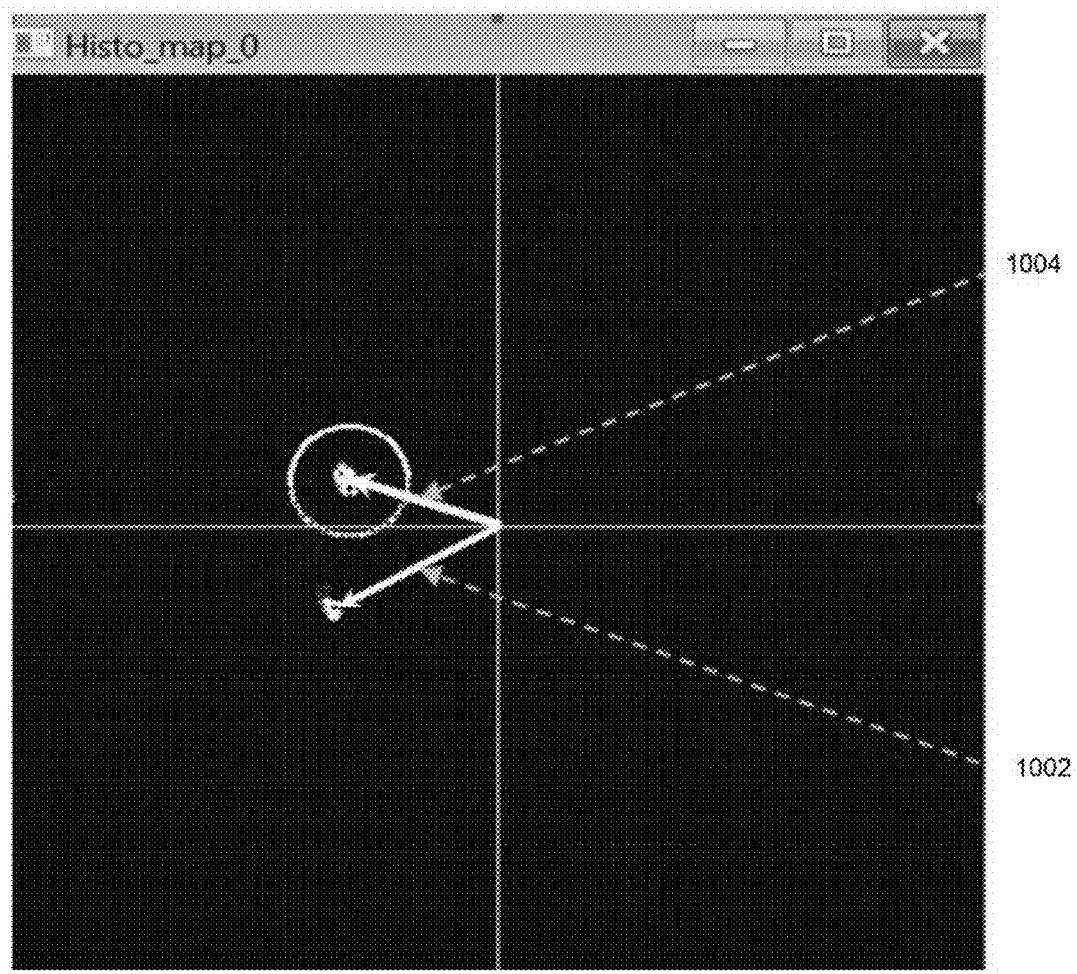
FIG. 10 is a diagram depicting a visualization of a threshold comparison between a portion motion vector for a portion and a global motion vector.

A determination of whether a portion motion vector for a portion is consistent with a global motion vector can be performed in a variety of ways. For example, a comparison can be made to determine whether the portion motion vector for a portion is within a threshold distance from the global motion vector for the setting. FIG. 10 is a diagram depicting a visualization of a threshold comparison between a portion motion vector for a portion (e.g., a local motion vector) at 1002 and a global motion vector at 1004. The portion motion vector 1002 and the global motion vector are plotted from a common origin, and a distance determination is made between the end points of the two motion vectors 1002, 1004. This is visualized in the example of FIG. 10 by a circle that is included around the arrow-tip of the global motion vector 1004 for the setting. This circle indicates a threshold distance. When an end point for the portion motion vector 1002 falls within the circle, then that portion is deemed to be consistent with the global motion vector 1004. When the arrow-tip falls outside of the circle, that portion is deemed to be inconsistent with the global motion vector. In another example, a portion motion vector's consistency with the global motion vector is determined based on a comparison of a magnitude and/or direction of the portion and global motion vectors.

Figure 11:
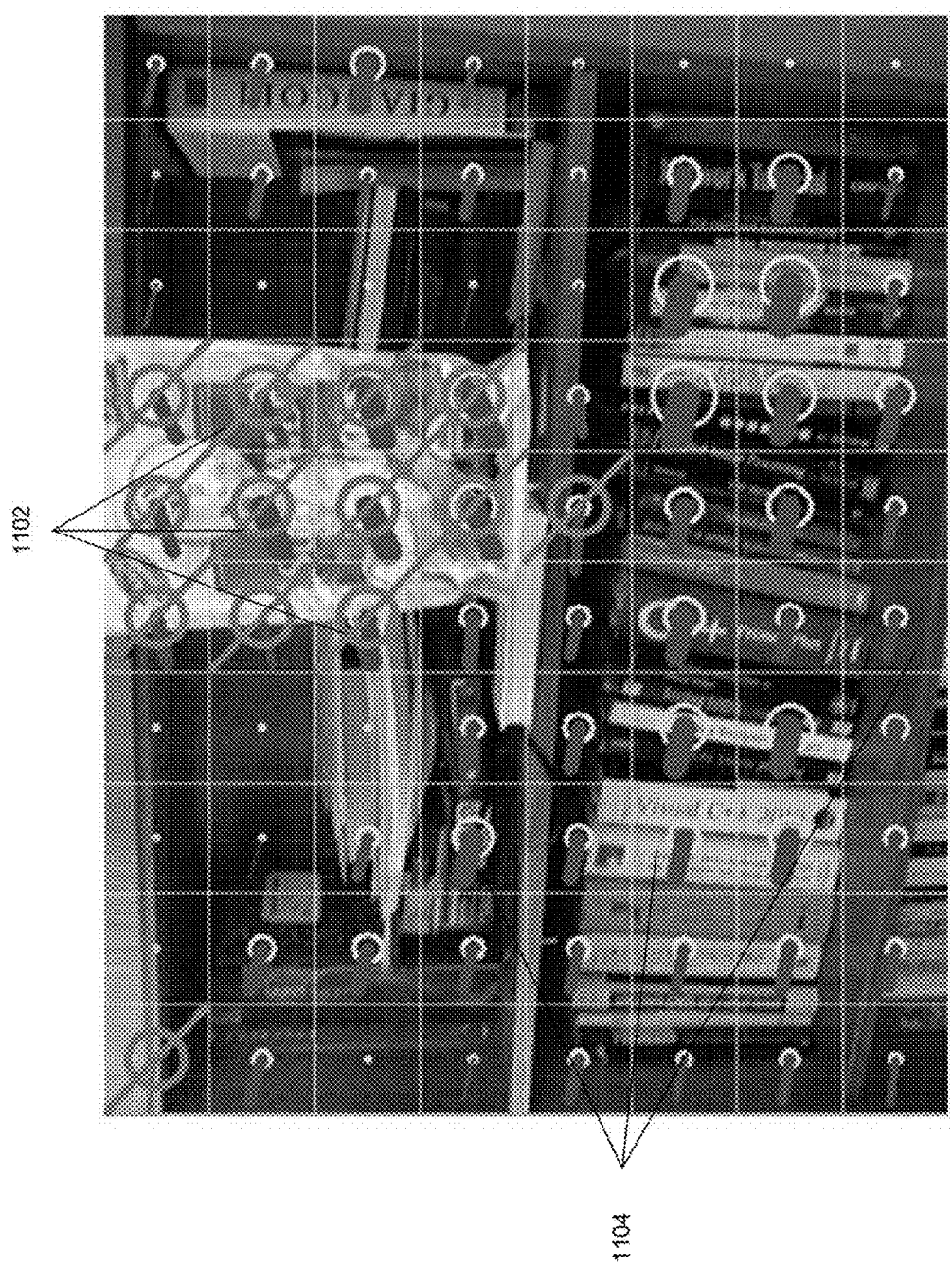
FIG. 11 is a diagram depicting portions determined to be consistent and inconsistent with the global motion vector.

FIG. 11 is a diagram depicting portions deemed consistent and inconsistent with the global motion vector, which masks out certain portions containing local motion in the 2-dimensional vector histogram. Portions having diagonal strikethrough indication (e.g., portion 1102) were deemed to be inconsistent with the global motion vector. These inconsistent portions correspond to the local motion associated with the bag of raisins falling through the setting. Portions (e.g., portions 1104) that do not include the local motion bag falling are deemed consistent with the global motion vector because their portion motion vectors are similar to the global motion vector.

Figure 12:
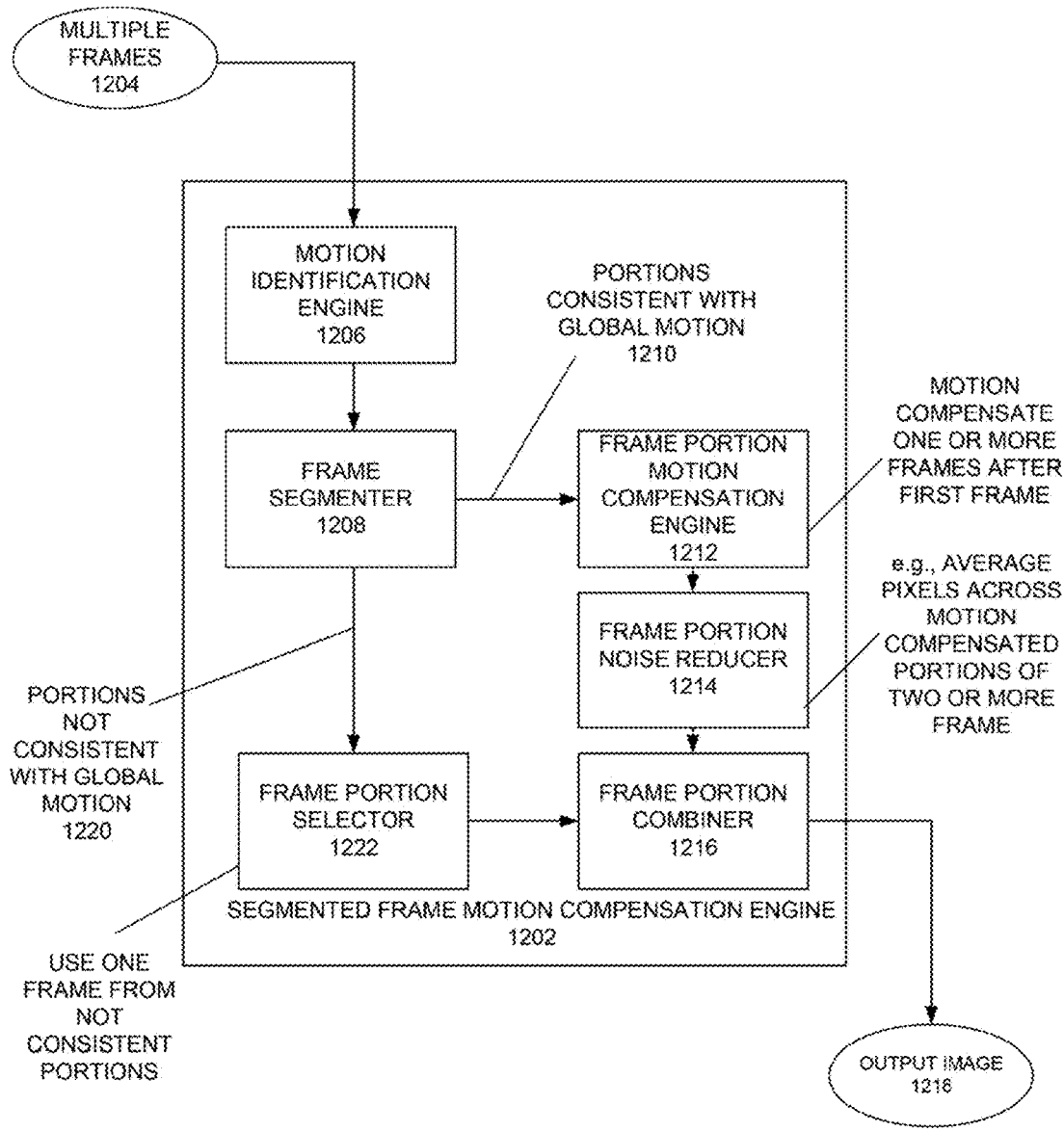
FIG. 12 is a diagram depicting additional example operations of a segmented frame motion compensation engine.

FIG. 12 is a diagram depicting additional example operations of a segmented frame motion compensation engine. The compensation engine 1202 receives image data, such as in the form of multiple frames 1204 relating to a setting, where the multiple frames 1204 differ from one another due to motion occurring across the frames relating to the setting. A motion identification engine 1206 identifies motion vectors that indicate motion across image frames. The motion identification engine 1206 determines if there is global motion, and, if global motion exists, further determines a global motion vector that indicates a magnitude and direction of global motion across the frames. The motion identification engine 1206 also determines portion motion vectors for each of a plurality of portions of the setting (e.g., portions of a first frame captured of the setting). A frame segmenter 1208 determines which of a plurality of portions are consistent (e.g., which portions have portion motion vectors that are less than a threshold amount different from the global motion vector) with the global motion vector.

Portions consistent with the global motion vector are processed via branch 1210. An image portion motion compensation engine 1212 performs adjustments to the pixels in portions that are consistent with the global motion vector (e.g., positions of pixels in a second frame are adjusted based on the global motion vector so that those pixels are aligned in the consistent portion with pixels in the first frame). For example, the first frame is identified as an anchor frame. For a portion of the anchor frame determined to be consistent with the global motion vector, the global motion vector (or the portion motion vector for the portion) is used for motion compensation. That global motion vector indicates a displacement of points from the first frame to the second (e.g., displacement of 4 pixels at 213 degrees per frame). The pixels of the second frame for that portion (e.g., pixels in the second frame, identified as being associated with that portion based on an x-y translation indicated by the global motion vector) are adjusted opposite (i.e., 180 degrees offset from) that global motion vector (e.g. –4 pixels at 213 degrees or 4 pixels at 33 degrees) so that the pixels of the second frame are aligned with the first frame for that portion. A third frame can similarly be adjusted for the consistent portion of the anchor frame (e.g., –8 pixels at 213 degrees), and so on. Once the frames are aligned, an image portion noise reducer 1214 reduces noise in the portions consistent with the global motion vector by averaging the pixel values of the corresponding aligned pixels across the multiple frames. Those averaged pixel values of corresponding pixels for the consistent portions are provided to a frame portion combiner 1216 to partially form a motion compensated output image 1218.

Figure 13:
FIG. 13 is a depiction of a global motion aligned and local motion compensated output image generated based on the four frames depicted in FIG. 4 that were captured of the setting in burst mode.

Frame portion selector 1222 operates on the remainder of the frame portions. That is, the frame portion selector 1222 selects the frame portions that had portion motion vectors that were inconsistent with the global motion vector (e.g., portions 1102 indicated by the strikethrough notation in FIG. 11). Frame portion selector 1222 selects pixel data corresponding to one of the frames (e.g., the first, anchor frame) to be used in the output image 1218 for these inconsistent portions (i.e., the image from the first frame is used for the inconsistent portions without adjustment). That pixel data is provided to the frame portion combiner 1216. The frame portion combiner 1216 combines the motion compensated portions from 1214 and the selected frame pixels from 1222 for the inconsistent portions to generate the motion compensated output image 1218. FIG. 13 is a depiction of a global motion aligned and local motion compensated output image generated based on the four frames depicted in FIG. 4 that were captured of the setting in burst mode.

This application uses examples to illustrate the invention. The patentable scope of the invention includes other examples. For example, while the examples described herein determine a single global motion vector for an entire set of frames, in some examples, a setting can be sub-divided further, where global motion vectors are determined for sub-divisions of the setting (e.g., the setting could be divided into four quarters), where the processing described herein for the entire setting can instead be applied separately to each sub-division of the setting.

It is claimed:
1. A processor-implemented method for mitigating image noise, comprising:
   identifying point motion vectors for a plurality of points of a first frame depicting a setting, each respective one of the point motion vectors indicating motion of a respective point from the first frame depicting the setting to a second frame depicting the setting;
   determining, from the point motion vectors, a global motion vector that indicates global motion spanning the first frame to the second frame;
   identifying portion motion vectors for each respective one of a plurality of portions of the first frame based on a plurality of point motion vectors associated with points within the respective one of the portions in the first frame, each respective one of the portions being less than an entire frame, each respective one of the portion motion vectors indicating motion, of a respective one of the portions, from the first frame to the second frame;
   determining that a first portion of the plurality of portions has a portion motion vector that is consistent with the global motion vector, and that a second portion has a portion motion vector that is inconsistent with the global motion vector;
   performing motion compensation on the first frame and the second frame to align the second frame with first frame at the first portion that is consistent with the global motion vector to generate an output image that is based on both of the two frames; and
   incorporating, into the output image, the inconsistent second portion from exactly one of the frames, without performing separate motion compensation on the inconsistent second portion.

2. The method of claim 1, wherein the global motion vector identifies a magnitude and direction of global motion across the first frame and the second frame.

3. The method of claim 1, wherein the first portion is determined to be consistent with the global motion vector based on the portion motion vector of the first portion being different from the global motion vector by less than a threshold amount.

4. The method of claim 1, wherein the second frame is motion-compensated by:
   adjusting the second frame based on the global motion vector to align the second frame with the first frame at the first portion; and
   averaging pixel values of corresponding pixels in the aligned first portion of the first frame and the second frame.

5. The method of claim 4, wherein the second frame is adjusted by moving one or more pixels by the magnitude of the global motion vector in a direction opposite the direction of the global motion vector.

6. The method of claim 4, further comprising:
   adjusting a third frame based on the global motion vector to align the third frame with the first frame at the first portion;
   wherein averaging pixel values of corresponding pixels further includes using the pixel values of pixels in the aligned first portion of the third frame.

7. The method of claim 1, wherein incorporating the inconsistent second portion comprises extracting image data associated with the inconsistent second portion from the first frame and incorporating the extracted image data into the output image.

8. The method of claim 1, wherein identifying a point motion vector for a particular point comprises:
   identifying a point in the setting that appears in a particular position in the first frame;
   identifying a position at which the point appears in the second frame;
   determining a change in position of the point from the first frame to the second frame; and
   determining the point motion vector based on the change in position.

9. The method of claim 1, wherein the second frame is captured within 0.5 seconds of the first frame.

10. The method of claim 1, wherein the first frame and the second frame are captured by a mobile communications device.

11. The method of claim 1, wherein the global motion across the first frame and the second frame is a result of a pan action or a zoom action.

12. The method of claim 1, wherein the inconsistent second portion is associated with local motion, wherein the local motion is a result of movement of an object in the setting.

13. The method of claim 1, further comprising:
populating a data structure with a motion vector for each of the plurality of portions, wherein the motion vector for a particular portion is based on an average of motion vectors or a most common motion vector for points within the particular portion.

14. The method of claim 1, wherein the determining, from the point motion vectors, a global motion vector, comprises selecting a most commonly appearing point motion vector as the global motion vector.

15. The method of claim 1, wherein the determining, from the point motion vectors, a global motion vector, comprises determining the global motion vector based on an average of the point motion vectors.

16. A processor-implemented system for mitigating image noise, comprising:
a processing system comprising one or more data processors;
a non-transitory computer-readable medium encoded with instructions for commanding the processing system to execute a method for mitigating image noise, comprising:
instructions for identifying point motion vectors for a plurality of points in a first frame depicting a setting, each respective one of the point motion vectors indicating motion of a respective point from the first frame depicting the setting to a second frame depicting the setting;
instructions for determining, from the point motion vectors, a global motion vector that indicates global motion spanning the first frame to the second frame;
instructions for identifying portion motion vectors for each respective one of a plurality of portions of the first frame based on a plurality of point motion vectors associated with points within the respective one of the portions in the first frame, each respective one of the portions being less than an entire frame, each respective one of the portion motion vectors indicating motion, of a respective one of the portions, from the first frame to the second frame;
instructions for determining that a first portion of the plurality of portions has a portion motion vector that is consistent with the global motion vector, and that a second portion has a portion motion vector that is inconsistent with the global motion vector;
instructions for performing motion compensation on the first frame and the second frame to align the second frame with first frame at the first portion that is consistent with the global motion vector to generate an output image that is based on both of the two frames; and
instructions for incorporating, into the output image, the inconsistent second portion from exactly one of the frames, without performing separate motion compensation on the inconsistent second portion.

17. The system of claim 16, further comprising an image capture device.

18. The system of claim 16, wherein the non-transitory computer-readable medium is further configured to store one or more data structures for tracking the point motion vectors, the global motion vector, the portion motion vectors, and an identification of the consistent first portion.

19. A non-transitory computer-readable medium encoded with instructions for commanding a processing system to execute a method for mitigating image noise, comprising:
instructions for identifying point motion vectors for a plurality of points in a first frame depicting a setting, the point motion vectors indicating motion from the first frame depicting the setting to a second frame depicting the setting;
instructions for determining, from the point motion vectors, a global motion vector that indicates global motion spanning the first frame to the second frame;
instructions for identifying portion motion vectors for each respective one of a plurality of portions of the first frame based on a plurality of point motion vectors associated with points within the respective one of the portions in the first frame, each respective one of the portions being less than an entire frame, the portion motion vectors indicating motion, of a respective one of the portions, from the first frame to the second frame;
instructions for determining that a first portion of the plurality of portions has a portion motion vector that is consistent with the global motion vector, and that a second portion has a portion motion vector that is inconsistent with the global motion vector;
instructions for performing motion compensation on the first frame and the second frame to align the second frame with first frame at the first portion that is consistent with the global motion vector to generate an output image that is based on both of the two frames; and
instructions for incorporating, into the output image, the inconsistent second portion of exactly one of the frames, without performing separate motion compensation on the inconsistent second portion.

20. The non-transitory computer-readable medium of claim 19, wherein the instructions for determining, from the point motion vectors, a global motion vector, comprise instructions to select a most commonly appearing point motion vector as the global motion vector.

21. The non-transitory computer-readable medium of claim 19, wherein the instructions for determining, from the point motion vectors, a global motion vector, comprise instructions to determine the global motion vector based on an average of the point motion vectors.

22. The system of claim 16, wherein the instructions for determining, from the point motion vectors, a global motion vector, comprise instructions to select a most commonly appearing point motion vector as the global motion vector.

23. The system of claim 16, wherein the instructions for determining, from the point motion vectors, a global motion vector, comprise instructions to determine the global motion vector based on an average of the point motion vectors.

* * * * *